United States Patent [19]
Greenhalgh

[11] 3,884,926
[45] May 20, 1975

[54] DISPERSE DYESTUFFS

[75] Inventor: Colin William Greenhalgh, Manchester, England

[73] Assignee: Imperial Chemical Industries Limited, London, England

[22] Filed: July 12, 1973

[21] Appl. No.: 378,608

[30] Foreign Application Priority Data
Aug. 15, 1972 United Kingdom............... 38011/72

[52] U.S. Cl.......... 260/289 QP; 260/287 R; 8/21 C; 8/177 R; 8/178 E; 8/178 R; 8/179
[51] Int. Cl............................................ C07d 33/48
[58] Field of Search................... 260/289 QP, 287 R

[56] References Cited
UNITED STATES PATENTS
2,795,582   6/1957   Bauer et al..................... 260/287 R
3,473,881  10/1969   Hallada......................... 260/289 QP
3,639,405   2/1972   Walker......................... 260/289 QP
3,788,810   1/1974   Kalz et al...................... 260/289 QP

*Primary Examiner*—Donald G. Daus
*Assistant Examiner*—David E. Wheeler
*Attorney, Agent, or Firm*—Cushman, Darby & Cushman

[57] ABSTRACT

The disperse dyestuffs of the formula:

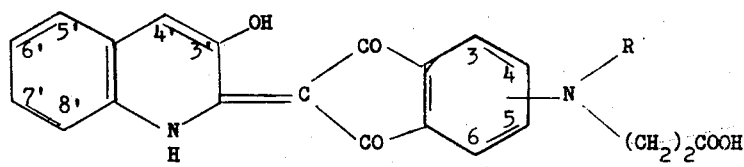

wherein R is a hydrogen atom, an acyl radical or an optionally substituted alkyl radical, and the carbon atoms in the 4', 6' or 8' position of the quinoline ring can be substituted by chlorine or bromine atoms, processes for the manufacture of the said dyestuffs, and their use for colouring synthetic textile materials.

1 Claim, No Drawings

DISPERSE DYESTUFFS

This invention relates to disperse dyestuffs of the quinophthalone series which are valuable for colouring synthetic textile materials, in particular aromatic polyester textile materials.

According to the invention there are provided the disperse dyestuffs of the formula:

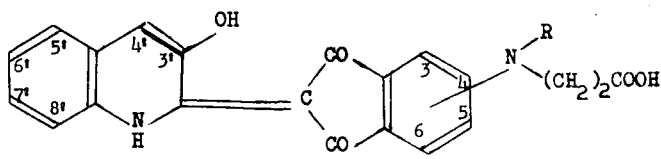

wherein R is a hydrogen atom, an acyl radical or an optionally substituted alkyl radical, and the carbon atoms in the 4′, 6′ or 8′-position of the quinoline ring can be substituted by chlorine or bromine atoms.

The acyl radicals represented by R are preferably of the formula XCO- wherein X is hydrogen or aryl such as phenyl or alkyl in particular lower alkyl such as methyl, ethyl, n-propyl and n-butyl.

Throughout this Specification the terms "lower alkyl" and "lower alkoxy" are used to denote alkyl and alkoxy radicals respectively containing from 1 to 4 carbon atoms.

The alkyl radicals represented by R are preferably lower alkyl radicals, and the substituted alkyl radicals represented by R are preferably substituted lower alkyl radicals such as hydroxy lower alkyl, cyano lower alkyl and lower alkoxy lower alkyl radicals.

According to a further feature of the invention there is provided a process for the manufacture of the dyestuffs of the invention wherein R is a hydrogen atom or an optionally substituted alkyl radical which comprises reacting with acrylic acid a compound of the formula:

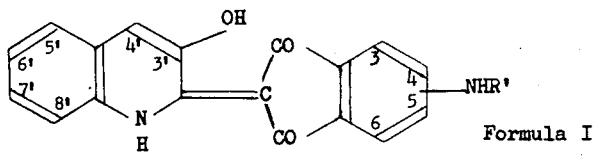

Formula I wherein R′ is hydrogen or an optionally substituted alkyl radical, and the carbon atoms in the 4′, 6′ or 8′ position of the quinoline ring can be substituted by chlorine or bromine atoms.

This process of the invention can be conveniently carried out by heating the compound of Formula I and the acrylic acid together, preferably at a temperature between 100° and 150°C, an excess of acrylic acid being used in order to keep the reaction mixture fluid. The resulting dyestuff is then isolated in conventional manner, for example by pouring the reaction mixture into water, and filtering off the precipitated solid.

The compounds of Formula I can themselves be obtained for example by condensing an optionally chlorinated or brominated 2-methyl-3-hydroxyquinoline-4-carboxylic acid with a nitrophthalic anhydride, reducing the nitro group to an amino group, and when necessary condensing this with a compound of the formula $R^2X$ wherein X is chlorine or bromine and $R^2$ is an optionally substituted alkyl radical.

According to a further feature of the invention there is provided a process for the manufacture of the dyestuffs of the invention wherein R is an acyl radical which comprises treating a dyestuff of the invention wherein R is a hydrogen atom with an acylating agent. The process of the invention can be conveniently carried out by stirring the dyestuff wherein R is a hydrogen atom and the acylating agent together in a suitable liquid medium such as pyridine or chlorobenzene, optionally containing an acid-binding agent. The resulting acyl derivative can then be isolated in conventional manner, for example by distilling off the liquid medium in the presence of steam and then filtering off the precipitated dyestuff from the resulting aqueous liquor. As examples of the said acylating agents there may be mentioned acetyl chloride, acetic anhydride and benzoyl chloride.

The dyes of the invention are yellow and may be used for the colouration of synthetic textile materials as dispersions by methods which have been fully described in the prior art. Synthetic textile materials which may be coloured include aromatic polyesters, for example polyethylene tetephthalate, cellulose esters, for example cellulose acetate and cellulose triacetate, polyamides, for example nylon 66 and nylon 6, polyacrylonitrile and polyurethanes, and their blends with each other or with natural fibres such as wool and cellulosic fibres.

The dyes of the invention can also be applied to aromatic polyester textile materials by dissolving the dyestuff in an aqueous solution of an alkaline agent, acidifying the resulting solution, adding the aromatic polyester textile material to the resulting dyebath, and then carrying out the dyeing in a conventional manner, for example by heating at 130°C under superatmospheric pressure. At the conclusion of the dyeing, the dyed textile material is removed from the dyebath, rinsed in water, preferably given a rinse in an aqueous solution of an alkali, rinsed again in water, and finally dried.

The colourations have good fastness to light, to dry heat treatments, to wet treatments and to rubbing.

The invention is illustrated but not limited by the following Examples in which the parts and percentages are by weight.

EXAMPLE 1

A mixture of 0.5 part of 3-amino-3′-hydroxyquinophthalone and 10 parts of acrylic acid is heated for 15 minutes at 135° to 140°C. The mixture is poured into 100 parts of water and the precipitated solid is filtered off. The dyestuff is then purified by dissolving it in an aqueous solution of sodium hydroxide, filtering the solution, acidifying the filtrate and filtering off the precipitated solid.

When the dyestuff is applied to a polyester textile material from an aqueous dyebath (itself prepared by dissolving the dyestuff in aqueous alkali and subsequently acidifying) yellow shades of excellent fastness properties are obtained.

The 3-amino-3'-hydroxyquinophthalone used in the above Example was itself obtained by condensing 2-methyl-3-hydroxyquinoline-4-carboxylic acid with 3-nitrophthalic anhydride in trichlorobenzene at 200°C, and subsequently reducing the nitro group to an amino group by treatment with an aqueous solution of sodium sulphide.

In place of the 3-amino-3'-hydroxyquinophthalone used in the above Example there are used equivalent amounts of 4-amino-6'-(chloro- or bromo-)-3'-hydroxyquinophthalone or 4-amino-6':8'-dibromo-3'-hydroxyquinophthalone when similar yellow dyestuffs are obtained.

These aminoquinophthalones used as starting materials are themselves obtained by condensing 6-(chloro- or bromo-) or 6:8-dibromo-2-methyl-3-hydroxyquinoline-4-carboxylic acid respectively with 3-nitrophthalic anhydride and subsequently reducing the nitro group to an amino group.

EXAMPLE 2

In place of the 0.5 part of 3-amino-3'-hydroxyquinophthalone used in Example 1 there is used 0.5 part of 4-amino-3'-hydroxyquinophthalone whereby 4-(β-carboxyethylamino)-3'-hydroxyquinophthalone is obtained, which dyes aromatic polyester textile materials from an aqueous dyebath in yellow shades of excellent fastness properties.

The 4-amino-3'-hydroxyquinophthalone was itself obtained by condensing 2-methyl-3-hydroxyquinoline-4-carboxylic acid with 4-nitrophthalic anhydride and subsequently reducing the nitro group to an amino group.

EXAMPLE 3

A mixture of 1 part of 3-(β-carboxyethylamino)-3'-hydroxyquinophthalone (which is the first dyestuff of Example 1) and 10 parts of acetic anhydride is stirred for 1½ hours at 100°C. The mixture is cooled, poured into water, and the precipitated 3-(N-acetyl-β-carboxyethylamino)-3'-hydroxyquinophthalone filtered off, washed with water and dried.

The product dyes aromatic polyester textile materials from an aqueous dyebath in bright lemon-yellow shades of excellent fastness properties.

A similar dyestuff is obtained when the 10 parts of acetic anhydride used in the above Example are replaced by 13 parts of sec-butyric anhydride.

EXAMPLE 4

In place of the 0.5 part of 3-amino-3'-hydroxyquinophthalone used in Example 1 there are used 2.0 parts of 3-amino-4'-bromo-3'-hydroxyquinophthalone. The resulting 3-(β-carboxyethylamino)-4'-bromo-3'-hydroxyquinophthalone when dispersed in aqueous media dyes aromatic polyester textile materials in yellow shades of excellent fastness properties.

The 3-amino-4'-bromo-3'-hydroxyquinophthalone used in this Example was itself obtained by reacting 3-nitro-3'-hydroxyquinophthalone with bromine in trichlorobenzene at 100°C, and subsequently reducing the nitro group to an amino group by treatment with an aqueous solution of sodium sulphide at 90°C.

I claim:

1. A disperse dyestuff of the formula:

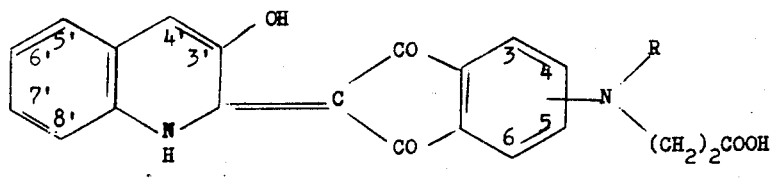

wherein R is selected from the group consisting of hydrogen, lower alkyl and —CO lower alkyl, and the carbon atoms in the 4', 6' or 8' positions of the quinoline ring can be substituted by chlorine or bromine.

* * * * *